United States Patent [19]
Hancock

[11] 3,983,431
[45] Sept. 28, 1976

[54] LOW VOLTAGE ALUMINUM COMMUTATORS

[75] Inventor: James Lloyd Hancock, Fairborn, Ohio

[73] Assignee: General Motors Corporation, Detroit, Mich.

[22] Filed: Dec. 23, 1974

[21] Appl. No.: 535,348

[52] U.S. Cl. .......... 310/233
[51] Int. Cl.$^2$ .......... H02K 13/04
[58] Field of Search .......... 310/232, 219, 233, 228, 310/234, 229, 235, 236, 237, 42, 43, 45, 231; 29/195, 597, 197; 148/6.27; 427/90; 204/57; 174/138

[56] References Cited

UNITED STATES PATENTS

| | | | |
|---|---|---|---|
| 1,641,414 | 9/1927 | Critchfield | 310/235 |
| 2,316,652 | 4/1943 | Moeller | 310/235 |
| 3,450,914 | 6/1969 | Demerciere | 310/236 |
| 3,566,460 | 3/1971 | Yamaguchi | 310/236 |
| 3,659,130 | 4/1972 | Lilley | 310/234 |
| 3,668,449 | 6/1972 | King | 310/236 |
| 3,777,367 | 12/1973 | Kalagidis | 310/234 |
| 3,861,027 | 1/1975 | Allen | 310/234 |

*Primary Examiner*—R. Skudy
*Attorney, Agent, or Firm*—George A. Grove

[57] ABSTRACT

In accordance with a preferred embodiment of this invention, a commutator for electrical machines having a polymeric spool and aluminum alloy bars uniformly spaced around its periphery is formed. This commutator is useful in low voltage applications wherein the applied or produced voltage may vary from 3 to 30 volts. A critical feature in forming this commutator is the combination of an electrolytic etch and an electrolytic oxide formation on the surface of the aluminum alloy bars. This combination of steps provides means for bonding the aluminum alloy bars to the polymeric spool and also lowers the electrical resistance of alumina. In addition, alloying elements, preferably iron, increase the conductivity of the alumina layer and directionally balance the electrical resistance across the aluminum-alumina junction.

2 Claims, 6 Drawing Figures

LOW VOLTAGE ALUMINUM COMMUTATORS

FIELD OF THE INVENTION

This invention relates to a commutator which has aluminum alloy bars and which is suitable in low voltage applications, and a method of producing same.

BACKGROUND OF THE INVENTION

In these times of shortages, copper may be added to the list of raw materials in short supply and increasing demand. This situation raises prices and creates an enthusiastic interest in consumers for substitute materials. One of the most viable substitutes for copper has long been aluminum. This material is less expensive than copper and its electrical properties are only slightly less attractive. As a result, there has been a considerable effort expended to substitute aluminum in those applications where the losses created by the less attractive electrical properties would be tolerable.

However, aluminum has not been successfully substituted for copper in commutator bars designed for low voltage applications. There are two reasons for this failure. First, aluminum is not physically as strong as copper, and because of its relative weakness, the conventional process of forming the commutator and fastening the bars to the spool cannot be used. In this process the commutator spool is molded around projections, called retention hooks, which extend inwardly from each bar into the spool. The process requires relatively high molding pressures and aluminum does not have the strength to withstand the forces necessary to form the spool, and the projections are crushed. Secondly, aluminum, when exposed to the atmosphere, forms an oxide (i.e., alumina) layer on its surface. The alumina-aluminum junction is an electrical valve or diode; that is, the electrical resistance in one direction across the junction is less than it is in the opposite. In general, the net resistance of this oxide is relatively high, but in high voltage applications it presents few problems. However, in applications such as the automotive 6 or 12 volt systems the increased resistance significantly reduces the performance of any motor equipped with aluminum commutator bars.

To date these problems have effectively precluded the use of aluminum alloy commutator bars in low voltage applications.

OBJECTS OF THE INVENTION

It is an object of this invention to provide a new and improved commutator which has high surface area, alumina coated, aluminum alloy bars bonded to and spaced around the periphery of a resinous spool and which is suitable in low voltage electrical machinery applications, and a method of forming same.

It is a further object of this invention to provide a method of treating an aluminum alloy so as to first substantially increase the surface area and then form an oxide layer thereon and thereby make it a suitable material for commutator bars in low voltage electrical machinery applications.

It is a further object of this invention to provide a corrosion-resistant armature for use in electrical machines, said armature having both aluminum alloy commutator bars and aluminum wire armature windings, and which machine is suitable in applications wherein the applied voltage may be as low as 3 volts.

SUMMARY OF THE INVENTION

I have developed a novel commutator having aluminum alloy bars and a resinous spool. In accordance with a preferred embodiment of this invention, the above objects are accomplished by electrolytically etching and then electrolytically forming a tenacious oxide layer, having an extremely large exposed surface area on the aluminum bars, and then molding an electrically nonconductive resinous spool against this treated surface. It is emphasized that the oxide film is preferably deposited both on the inner surface of the commutator bar which forms the interface with the polymeric spool and on the outer surface as well, and that the oxide film serves a different purpose on each surface.

On the inner surface of the bar which forms the interface with the resinous spool, the oxide film provides an irregularly pitted surface against which the spool material is molded under high pressure and temperatures. During this molding operation the softened polymeric material is forced into the cavities of this surface and upon hardening forms a mechanical interlocking bond which firmly holds the aluminum alloy bar in position on the spool surface.

On the outer surface, the hard oxide film protects the aluminum bar from excessive wear and electrical erosion. In addition, the combination of the etch and the oxide deposition generates a very irregular surface, which has a large surface area and many small irregular cavities. In use, the irregularities of this surface are filled with a soft conductive material such as that used in current collecting brushes. In this filled condition, the large surface area significantly increases the electrical conductivity of the oxidized aluminum alloy surface. The conductivity of the aluminum alloy commutator bar is also increased by the presence of one or more alloying elements. Iron, at a concentration of from about 0.1% by weight to about 1.0% by weight is preferred. The alloying elements also apparently reduce the directionality of the electrical resistance at the aluminum-alumina junction.

The preparation of the aluminum alloy surfaces involves three basic steps — a cleaning step, a preferential electrolytic etching step, and an electrolytic formation of an oxide film ranging in thickness from about 500 to 1,500 angstroms.

The aluminum may be cleaned with a caustic solution, such as a one normal aqueous solution of sodium hydroxide, potassium hydroxide or ammonium hydroxide, or the like, at a temperature of about 140° F.; cleaning requires about thirty seconds.

After rinsing, the aluminum surfaces are electrolytically etched in a salt (brine) solution which is from about 75% to 90% saturated, and wherein the salt may be any of sodium chloride, potassium chloride, ammonium chloride, ammonium sulfate, and the like. The preferred temperature of the etching solution is in the range of about 190° F.; however, any temperature at which the salt solution is liquid would be suitable. Current is applied at a density in the range of from about 4 to about 8 amperes per square inch for a time ranging from about 30 to about 60 seconds. After the surface has been etched it should be cleaned with about a one normal mineral acid such as nitric acid at a temperature of about 190° F. This acid cleaning process facilitates the formation of an even oxide layer. The surface is then water rinsed and dried.

The oxide layer is formed by a solution of about 10% ammonium borate, or about 2% sodium tetraborate and about 30% boric acid at a temperature in the range of from about 180° to about 205° F.; the balance of this solution is water. A potential of preferably about 40 volts is applied for about thirty seconds. These conditions will deposit a film in the range of from about 500 to about 1,500 angstroms thick. The thickness of the film is apparently dependent only on the applied voltage if the exposure time is maintained within reasonable limits.

Once the oxide layer has been formed upon the surface of the aluminum alloy commutator bars, the intended outer surface of the bar (and not the inner surface) is then loaded with a soft conductive material such as that used in commutator brushes. Suitable materials would include electrographitic carbon, baked carbon, graphite, and the like. This may be done at any time prior to the assembly of the motor; however, since the brush material is typically an ideal lubricant, it is preferred that the surfaces be loaded prior to the molding of the commutator. The lubricant will then act as a mold release and protect the surfaces of the mold from the extremely hard and abrasive aluminum oxide as the commutator is removed from the mold. Preferably, the loading process involves abrading a commutator brush material against the aluminum surface and allowing the rough aluminum oxide surface to simply scrape from the brush enough conductive material to fill most of the irregularities in the aluminum surface.

It is to be understood that this loading process need not completely fill all cavities in the outer surface, as after a few hours of operation in an electrical motor the aluminum surface will indeed be filled with whatever brush material is in contact with the bars. However, this initial coating process should deposit enough conductive material on and into the treated aluminum surface to allow the motor to turn when electrically energized. Apparently, this coating process has the effect of reducing the resistance of either the commutator bar or the brush-bar contact or both.

Once the aluminum alloy surfaces have been treated in accordance with this invention, the aluminum alloy bars are spaced about the periphery of a mold cavity defining the outer shape of the commutator. The spool resin is then either injection or compression molded against the bars. Preferably, a mineral-filled phenolic thermosetting resin is used. No special steps need to be taken during the molding process; however, sufficient pressure and temperature must be used to force the resin into the irregularities of the treated aluminum alloy surface and thereby create a strong mechanical bond.

Electric motors have been made using the subject commutators with the aluminum alloy bars. After more than 300 hours of continuous operation at 12 volts there was no evidence of separation of aluminum bars from the spool and the motors performed well during these tests.

By using the processes disclosed herein it is possible to form a commutator having aluminum alloy bars which are firmly attached to the spool and which have sufficient conductivity to function in applications where the applied voltage is 3 volts or lower. In addition, the alumina ($Al_2O_3$) on the exterior surface of the commutator bars is an extremely hard material which significantly reduces wear of the bars.

These advantages and others will be more evident in view of a detailed description of this invention to include specific examples. This description will make references to the drawings, in which.

DETAILED DESCRIPTION OF THE INVENTION

Figure 1:
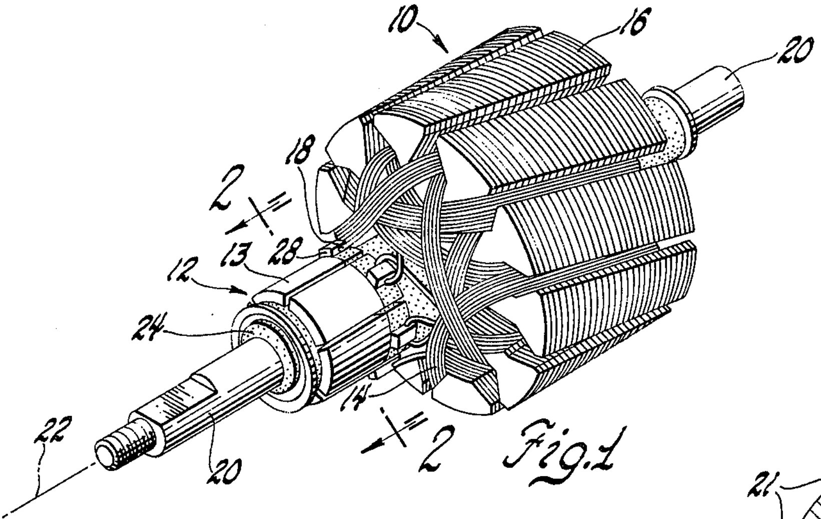
FIG. 1 is a perspective view of an armature for an electrical machine, having the subject aluminum alloy commutator bars.

In accordance with the practice of this invention, it is possible to both securely fasten an oxidized aluminum alloy commutator bar to the exterior surface of a resinous commutator spool and also to effectively reduce and balance the directional resistivity through the bar. This makes the subject aluminum alloy a suitable material for commutator bars used in low voltage electric motor applications such as those found in the 6 or 12 volt automotive electrical systems.

As mentioned above, one of the major reasons that aluminum or aluminum alloy commutator bars have not been used in low voltage applications is the fact that the oxide which forms naturally on aluminum is a dielectric, i.e., has a relatively high electrical resistance, and furthermore the aluminum-alumina junction is a rectifier.

Previously it was thought that a scrubbing or abrasive action would be necessary to eliminate this oxide to minimize the voltage drop in the operation of an electric motor; such could be provided by incorporating an abrasive into the brush composition. However, this created two new problems. First, the oxide particles were highly abrasive and tended to destroy both the brush and the bar, and the exposed soft aluminum has a substantially lower melting point than copper and thus was more susceptible to electrical erosion. Therefore, it became evident that it was necessary to work with this oxide layer rather than remove it.

It an attempt to reduce the net resistivity of the oxide layer and securely bond the aluminum alloy bars to the resinous spool I devised the following process for treating the preformed aluminum alloy bars. It is preferred that the aluminum alloy be formed to the shape of commutator bars before treatment since a forming process may mar the surface. However, some forming operations may be delayed until after the subject surface treatment, if they do not significantly mark the surface.

First, the aluminum surface is cleaned in a caustic solution such as sodium hydroxide, potassium hydroxide, ammonium hydroxide, and the like. The preferred strength of the cleaning solution is about one normal and the preferred temperature of the cleaning solution is within the range of about 135° to about 145° F.; a time of about 30 seconds should be adequate under these conditions. The cleaned surfaces are then rinsed with water at room temperature.

The next step is an electrolytic etch which attacks pure aluminum and alumina at different rates. Since both are on the surface of an aluminum bar a preferential etch will be achieved producing a highly irregular surface and a large surface area. The solution used in this step is aqueous and is from about 75% to 90% by weight saturated with a salt such as sodium chloride, potassium chloride, ammonium chloride, and ammonium sulfate, and the like. The surface is immersed in this solution at a preferred temperature within the range of from about 185° to about 195° F.; however, any temperature at which the solution is liquid would be suitable. A current is applied under sufficient potential to provide a preferred current density in the range of about 4 to about 8 amperes per square inch for a time period within the preferred range of from 30 to 60 seconds. However, it should be noted that a density ranging from 0.1 ampere per square inch to 8 amperes per square inch for suitable times would be adequate. The limiting parameters which determine the operative current density are (1) if it is too low, the etch becomes too selective and literally drills holes in the surface, and (2) if it is too high, it will cause the evolution of sufficient quantities of gas to inhibit the etching process.

After the etch, the surface should be rinsed with water and then a one normal mineral acid solution at a temperature within the range of 185° to 195° F. This acid rinse facilitates an even oxide formation. After the acid, the surface is to be rinsed with a demineralized or distilled water and then dried.

Once the surface has been electrolytically etched, rinsed with acid and then water, and dried, an oxide layer is electrolytically deposited from an aqueous solution containing about 10% ammonium borate, or 2% sodium tetraborate and 30% boric acid, with the balance being water; the percentages are on a by weight basis. The preferred temperature of the solution is within the range of from about 180° to about 205° F. with an applied potential of about 40 volts; however, any voltages from 10 to 500 would work if the time were varied from the preferred 30 seconds by a suitable amount to insure an oxide layer thickness of from 500 to 1500 angstroms. Once the film is applied, the surface is then rinsed with water and then dried.

A detailed description of the drawings will provide a better understanding of the nature and advantages of the subject invention.

FIG. 1 depicts an armature 10, of the type conventionally employed in rotating electrical machinery such as direct current motors and generators. The armature 10 has a commutator 12 which is made up of a plurality of spaced apart electrically conductive bars 13 mounted on the periphery of a supporting spool 24, which, in turn, is securely mounted on shaft 20. The bars 13, each have an exposed surface 15 which, when in use will form an electrical connection with current collecting brushes (not shown). Also securely mounted on armature shaft 20 is a plurality of aligned and slotted core plates 16. Suitably insulated electrically conductive wires 14, (windings) are wound around core plates 16 in a known manner. The wires 14, are electrically connected to extensions 28 (ears) protruding from bars 13 for this purpose. Armature shaft 20 is journaled in a suitable motor or generator housing which is not shown.

In an electric motor configuration, current is conducted to the commutator bars 13 through brushes which are not shown. The current is then conducted through the connecting points 18 and into the armature windings 14. Then, because of an interaction between the field generated by the current in the armature windings 14 and an externally imposed field, there is a net torque acting on the armature 10 causing it to rotate. In a generator configuration, the armature 10 is rotated by an externally applied force, and there is also an externally imposed field. The movement of the armature winding through the imposed field generates a current in the windings 14. This current is conducted from the windings 14 to the commutator bars 13, through the connections 18 and from the bars 13 through brushes not shown.

Figure 2:
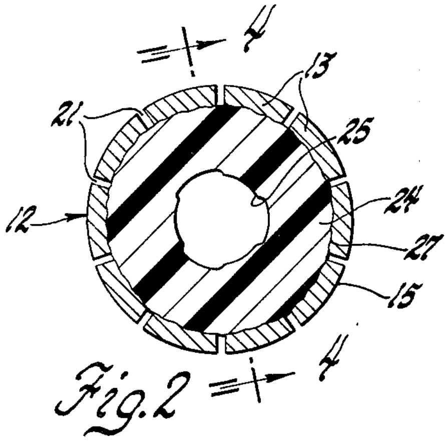
FIG. 2 is a cross-sectional view of the commutator at line 2—2 of FIG. 1 perpendicular to the longitudinal axis.

FIG. 2 is a cross-sectional view of the commutator taken at line 2—2 perpendicular to the axis 22 of the armature. This view shows the resinous spool 24, and a plurality of bars 13, spaced around the periphery of the spool 24. A keyed hole 25 allows the commutator to be fitted and securely mounted onto shaft 20. The insulating gap 21 which separates the bars is essential to the operation of the motor or generator in a direct current application. Concentricity of the commutator about the axis 22 is an important factor in determining the useful life of the commutator. A slight degree of eccentricity will drastically increase the rate of wear.

Figure 3:
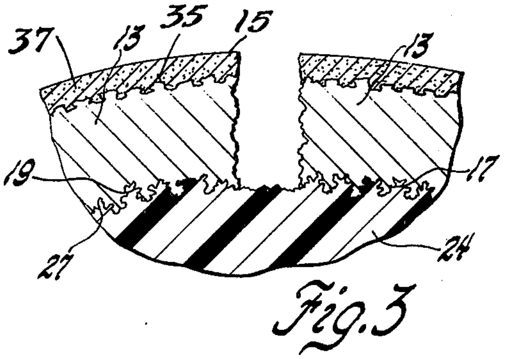
FIG. 3 is an expanded view of a portion of the cross section of FIG. 2 showing the mechanical bond which holds the bars to the spool.

FIG. 3 is an enlarged view of the interface between the treated surface of the aluminum alloy commutator bars 13 and the resinous spool 24. This view illustrates the irregular outer surface 35 of bars 13 loaded with a soft conductive material 37 and the nature of the interlocking mechanical bond at the interface 27 between the irregular inner surface 17 of the bars 13 and the resinous spool 24. This bond is formed at this interface 27 as the commutator is molded under high temperatures and pressures and the resin is literally forced into the cavities 19 of the etched and preferably oxidized aluminum alloy surface.

Figure 4:
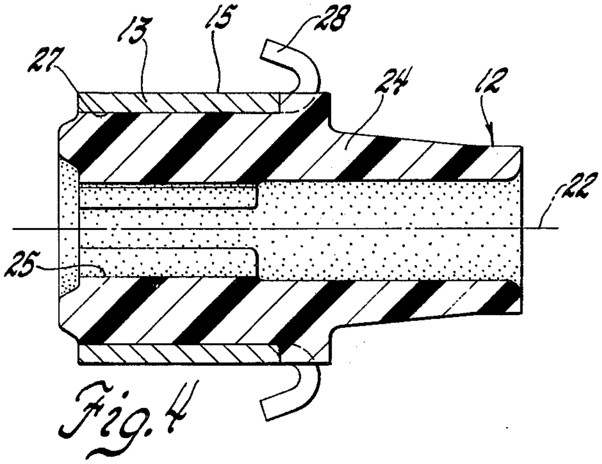
FIG. 4 is a cross-sectional view taken at line 4—4 of FIG. 2 showing a preferred commutator construction wherein the commutator bars have no retention hooks.

FIG. 4 is a cross-sectional view of a preferred embodiment of the commutator in which the interlocking bond formed at the treated aluminum-resin interface 27 is the sole means of holding the bars 13 to the spool 24. This view is taken on line 4—4 of FIG. 2 and parallel to the axis 22 of the armature 10. The projection 28, extending from one end of the commutator bar 13, provides the means by which the electrical connection between the armature windings 14 and the commutator bar 13 is made. Typically the wire 14, is wound under projection 28 which is then folded over and this connection is then soldered or welded. This connection is point 18 in FIG. 1.

Figure 5:
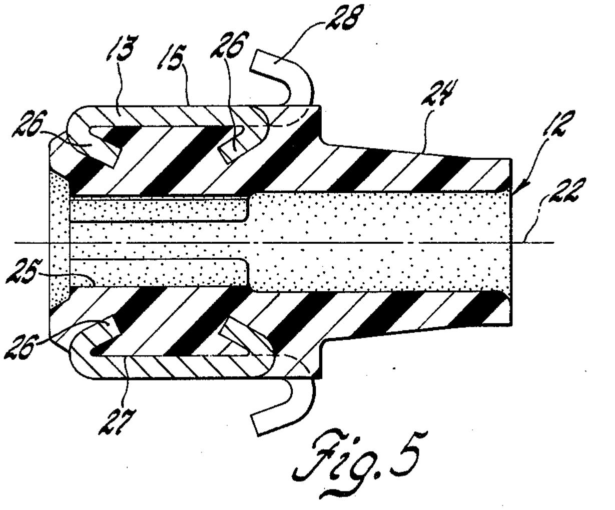
FIG. 5 is a cross-sectional view similar to that of FIG. 4 but showing another commutator construction wherein the bars have retention hooks.

FIG. 5 is a cross-sectional view of another embodiment of the commutator 12. This view is also taken at line 4—4 parallel to the axis 22 of the armature 10. In this embodiment, retention hooks 26 extend inwardly from the bars 13 into the spool 24. These hooks 26 provide additional means to securely bond the bars 13 to the spool 24.

Figure 6:
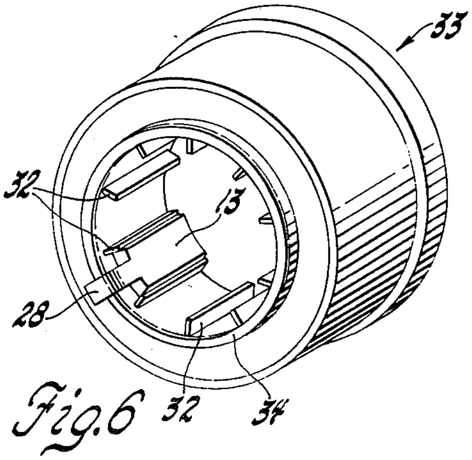
FIG. 6 is a perspective view of a portion of the mold used in forming the commutator. A commutator bar and means of positioning it in the mold are shown.

FIG. 6 depicts a portion of the mold 33 used to form the commutator 12. In this section of the mold the bars are uniformly spaced about the cavity and held in position by thin spacer plates 32 and the extentions 28 which hook over the ridge 34. Once all the bars are positioned in the cavity, the mold is closed, that is the illustrated portion, the core piece (not shown) and the end pieces (not shown) are assembled to form the cavity which defines the surfaces of the commutator then a thermosetting or thermoplastic resin is introduced and molded under suitably high pressures and temperatures to form the commutator and force the resin into the irregularities of the treated surfaces of the aluminum alloy bars.

It is to be understood that the scope of this invention is to include commutator bars having retention hooks (see FIG. 5, item 26), but it is preferable that these retention hooks be eliminated and that the interlocking bond (see FIG. 3) between the roughened aluminum alloy surface and the spool material serve as the only means to bond the bars to the exterior surface of the spool 24. The elimination of the retention hooks 26 provides several advantages. For example, there is a cost savings in forming the bars, but more importantly, the elimination of the retention hooks reduces the internal stresses created in the spool during the molding and subsequent cooling operations. It is well known that when two materials having different coefficients of expansion are integrally assembled and then heated and cooled, that the difference in thermal coefficients of expansion will generate significant internal stresses as one material has a tendency to shrink more rapidly and to a greater degree than the other. In the molding operation these internal stresses can easily distort the general shape of the commutator. Such distortions will greatly increase the rate of wear and consequently reduce the lifetime of the commutator. In addition, the use of individual bars spaced about the periphery of the mold cavity in place of the conventional shell shape which is cut after the molding operation to form the individual bars will also significantly reduce the internal stresses in the molded commutator.

It is preferred, primarily for economic reasons, that a mineral-filled phenolic be used as the spool resin; however, it is to be understood that practically any suitable nonconductive engineering polymer, whether it be thermosetting or thermoplastic, which is capable of being either compression or injection molded, would be suitable in this application.

It is preferred that an aluminum alloy containing from about 0.1% to 1.0% by weight iron be used in fabricating the subject commutator bars. This alloying element significantly contributes to the conductivity across the aluminum-alumina junction and through the alumina itself. It is believed that iron increases the conductivity through the aluminum oxide layer by physically breaching the oxide film, and since iron is a conductor of electricity it apparently provides a plurality of parallel current paths through the oxide layer. The iron in combination with the greatly increased surface area reduces the electrical resistance to a level that allows the aluminum alloy to be used, in place of the more expensive copper, as commutator bars in low voltage electrical machine applications.

However, at this point it is to be emphasized that the exact mechanism by which the conductivity of the aluminum surface, which has been treated in accordance with the practice of this invention, is increased is not thoroughly understood. In addition, it is to be understood that other conductive alloying elements, such as copper, magnesium, chromium, silver, gold and the like, to include combinations thereof, will also function in a similar manner as the iron and are therefore to be considered equivalents.

Strengthening alloying elements may also be added to the aluminum base metal to include specifically magnesium and copper. It is believed that these two materials will increase the tensile strength, modulus and hardness of the aluminum, and thereby improve the handling and wear characteristics of the commutator bars. However, it is to be understood that the total concentration of alloying elements should not exceed that level at which the aluminum alloy loses its natural tendency to have a tenacious oxide film on its surface. Once the oxide film is easily abraded from the aluminum surface it is no longer suitable in this application.

The following specific alloys have been tried and are preferred for the subject commutator bars in this application; all percentages are on a weight basis. 1) Alloy 3003 which contains from about 1.0% to about 1.5% manganese and has the following maximum limits about 0.6% silicon, about 0.7% iron, about 0.2% copper, and about 0.1% zinc; 2) Alloy 6061 which contains from about 0.4% to about 0.8% silicon, about 0.15% to about 0.4% copper, about 1.0% magnesium and, about 0.25% chromium and has the following upper limits, about 0.7% iron, about 0.1% manganese, about 0.25% zinc, about 0.15% magnesium, and about 0.15% titanium. Alloy 1100, which contains about 1% of a mixture of silicon and iron and has the following upper limits, about 0.2% of copper and about 0.05% manganese and about 0.1% zinc, was also tried and was suitable in this application. However, as the concentration of the iron is reduced to a level of less than about 0.1% and there are no significant concentrations of other alloying elements, the conductivity through the aluminum oxide layer is reduced and the material becomes unsuitable. Thus, the purest suitable aluminum alloy contains at least about 0.1% by weight iron, while the upper alloying limit is defined as that point where the aluminum alloy looses its ability to form a tenacious and conductive oxide layer, in no event should the total alloying element content exceed 10% by weight of the composition.

The formation of an interlocking mechanical bond between the treated aluminum surface and the spool resin is dependent upon, first, the presence of an irregular aluminum oxide surface having a great number of micro irregularities and having a large surface area; and, second, that the resin be forced against this surface under sufficient temperature and pressure to cause it to flow into these irregularities, thereby locking the aluminum alloy bar in place. The electrolytic etch is critical to the formation of a strong mechanical bond at the aluminum-resin interface. It is the aforementioned preferential character of this etching process which, in effect, chemically digs these irregularities in the surface.

The etch is properly considered "preferential" in that it will attack an aluminum portion of the surface much faster than it will attack a portion covered with aluminum oxides. Therefore, an aluminum surface which forms an oxide layer when exposed to the atmosphere, will be preferentially etched by such a solution. That is, those portions of the surface which have little or no oxide will be etched much faster than those portions which are covered. The subsequent deposition of an oxide film on the etched surface will, in effect, magnify the irregularities in the surface since the current density on a micro level will be higher at the peak than it will be at the valley of the surface. Therefore, the final surface which will receive the spool resin under high temperatures and pressures will be a very irregular surface having the necessary irregularities to form an interlocking mechanical bond.

While it is preferred that the inner surface of the aluminum alloy bars, which surface is bonded to the spool, be both electrolytically etched and oxidized, a suitable bond for some applications may be formed if this surface is only etched. The bond between the etched surface and the spool is weaker than that between the etched and oxidized surface and the spool, but the superior strength may not be needed in every application.

In this suitable embodiment it is possible to etch the aluminum alloy bars, form the commutator and then electrolytically form the oxide layer on the exposed outer surface of the bars.

While my invention has been disclosed in terms of certain specific embodiments, other forms thereof will be evident to those skilled in the art. Therefore, the scope of my invention should not be limited to those disclosed embodiments.

What is claimed is:

1. A wear resistant commutator particularly suitable in electrical machinery applications where the applied or produced voltage is as low as 3 volts, said commutator comprising:

a. a molded resinous electrically nonconductive spool; and b. a plurality of etched and electrically conductive aluminum alloy bars, each electrically insulated from all others, uniformly spaced around and securely bonded to the periphery of said spool, the etched surfaces of said bars having thereon a tenacious and conductive oxide layer having a thickness in the range of from about 500 to about 1,500 angstroms, wherein the surface of said layer is characterized by many small irregular cavities which on the inner surfaces of said bars contain the resinous spool material thereby forming a strong interlocking mechanical bond between said bars and said spool and which cavities on the outer surfaces of said bars are filled with a soft conductive material thereby increasing the electrical conductivity of said bars.

2. A wear resistant commutator particularly suitable in electrical machinery applications where the applied or produced voltage is as low as 3 volts, said commutator comprising:

a. a molded resinous electrically nonconductive spool; and b. a plurality of etched and electrically conductive aluminum alloy bars, each of said bars being electrically insulated from all others, and being uniformly spaced around and securely bonded to the periphery of said spool, wherein the inner surface of said bars may be characterized as having many small irregular cavities which contain the resinous spool material thereby forming said bond between said bars and said spool, and wherein the outer surface of said bars has thereon a tenacious and conductive oxide layer having a thickness in the range of from about 500 to 1,500 angstroms, said aluminum alloy contains at least about 0.1% by weight iron and may optionally contain other alloying elements selected from the group consisting of magnesium, manganese, silicon, copper, chromium, nickel, zinc, and titanium and combinations of any of the above, and wherein the total alloying element content is less than that which prevents the formation of said tenacious oxide layer.

* * * * *